US 8,035,746 B2

(12) United States Patent
Cai et al.

(10) Patent No.: US 8,035,746 B2
(45) Date of Patent: Oct. 11, 2011

(54) TIME BASE CORRECTION FOR DIGITIZED VIDEO SIGNAL

(75) Inventors: Li Bin Cai, Singapore (SG); Boon Keng Teng, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 1148 days.

(21) Appl. No.: 11/325,767

(22) Filed: Jan. 5, 2006

(65) Prior Publication Data

US 2006/0153530 A1     Jul. 13, 2006

(30) Foreign Application Priority Data

Jan. 12, 2005 (EP) .................................. 05300021

(51) Int. Cl.
*H04N 9/64* (2006.01)
*H04N 5/00* (2011.01)
*H04N 5/21* (2006.01)
(52) U.S. Cl. ......... 348/572; 348/575; 348/616; 348/628
(58) Field of Classification Search .................. 348/572, 348/575, 628, 458, 616
See application file for complete search history.

(56) References Cited

U.S. PATENT DOCUMENTS

| | | | | |
|---|---|---|---|---|
| 4,733,294 A | * | 3/1988 | Wesolowski .................. | 348/498 |
| 4,763,203 A | | 8/1988 | Oldershaw et al. | |
| 5,019,906 A | * | 5/1991 | Wesolowski .................. | 348/497 |
| 5,606,426 A | | 2/1997 | Kobayashi et al. | |
| 5,734,419 A | * | 3/1998 | Botsford et al. ................ | 348/97 |
| 5,828,786 A | * | 10/1998 | Rao et al. ....................... | 382/236 |
| 6,300,985 B1 | * | 10/2001 | Lowe et al. .................... | 348/665 |
| 6,714,717 B1 | | 3/2004 | Lowe et al. | |
| 6,839,094 B2 | * | 1/2005 | Tang et al. ..................... | 348/607 |
| 6,943,834 B1 | * | 9/2005 | Hirai ........................... | 348/231.6 |
| 7,289,170 B2 | * | 10/2007 | Jun ................................ | 348/790 |
| 7,405,766 B1 | * | 7/2008 | Chou et al. ..................... | 348/448 |
| 7,495,708 B2 | * | 2/2009 | Tan et al. ....................... | 348/572 |
| 2003/0081148 A1 | * | 5/2003 | Coste et al. .................... | 348/526 |
| 2006/0013569 A1 | * | 1/2006 | Tan et al. ....................... | 386/124 |

FOREIGN PATENT DOCUMENTS

EP     0810784 A     12/1997

OTHER PUBLICATIONS

Search Report.
Rhode & Schwarz: The digital Video Standard according to ITU-R BT. 601/656 Application Note 'Online! Jun. 29, 2003 XP002328249.

* cited by examiner

*Primary Examiner* — Brian Yenke
(74) *Attorney, Agent, or Firm* — Robert D. Shedd; Robert B. Levy

(57) ABSTRACT

The present invention relates to a method for time base correction during generation of a digital video signal from an analog input video signal, and to an apparatus having means for digitizing an analog input video signal using such method. According to the invention, the method includes the steps of:
  receiving an analog video signal;
  generating a digital video signal from the analog video signal with a video decoder;
  storing at least a part of the digital video signal in a memory;
  detecting a portion of corrupt data having an abnormal field ordering in the digital video signal;
  either discarding the portion of corrupt data or replacing at least a part of the portion of corrupt data with previous data stored in the memory; and
  outputting the digital video signal.

10 Claims, 4 Drawing Sheets

US 8,035,746 B2

TIME BASE CORRECTION FOR DIGITIZED VIDEO SIGNAL

This application claims the benefit, under 35 U.S.C. §119 of European Patent Application 05300021.2 filed Jan. 12, 2005.

FIELD OF THE INVENTION

The present invention relates to a method for time base correction during generation of a digital video signal from an analog input video signal, and to an apparatus having means for digitizing an analog input video signal using such method.

BACKGROUND OF THE INVENTION

Digital storage devices such as a HDD-recorder or a DVD-recorder usually have an analog video input for receiving analog audio/video signals from different kind of sources, and an analog video output for displaying the analog video signal on a television set. A typical processing flow of a HDD-recorder or a DVD-recorder is as follows: Analog video input→Video Decoder→MPEG Encoder→MPEG Decoder→Video Encoder→Analog Video Output. After decoding by the Video Decoder the analog video signal is first digitized by means of an Analog-to-Digital converter before any digital processing or compression is performed. The digitized video signal normally conforms to the ITU R-656 standard. The MPEG stream may be stored on a recording medium such as for example a DVD disc or a DVHS tape.

Some problems arise when the video source is a VCR or an un-tuned channel. In case the source is an un-tuned video channel, the video decoder may provide fields with incomplete lines or an incomplete number of lines per field. When the video source is a VCR, and the VCR operates in a trick mode such as fast forward/backward mode, the frame frequency is variable. There are less or more lines per frame than in the normal mode. In addition, in case of an edited tape, the field sequences may be reversed. A normal field order has Upper-Lower-Upper-Lower field ordering. An abnormal field ordering occurs when a consecutive field is the same as the previous field, i.e. Upper-Lower-Lower-Upper-Lower or Upper-Upper-Lower-Upper-Lower. In pause mode, stop mode or double speed mode of the VCR, only Upper fields or Lower fields are provided, i.e. the field ordering is Upper-Upper-Upper . . . or Lower-Lower-Lower . . . .

In all of the above problematic cases the video decoder provides abnormal frame data to the MPEG Encoder chip in the ITU-R BT.656 4:2:2 format. This will make the MPEG Encoder chip choke and lose sync, the pictures become un-smooth, will pause and even freeze.

In this context JP 2002-010217 discloses a video signal processing device capable of solving the above freezing and block noise issue when a non-standard signal is input to a MPEG encoder. A time-axis amendment circuit transforms the input signal into a near-standard signal, and a reset circuit generates a reading synchronization when the field length deviates. A field distinction circuit amends the Upper and Lower order when a non-interlaced signal is input.

U.S. Pat. No. 6,714,717 describes a time base corrector apparatus for removing time base errors from video signals. Time base correction is accomplished by lengthening or shortening each video line in sub-pixel increments by using an interpolator circuit to interpolate consecutive pixels. The interpolator compensates for too few pixels per line by compressing the stretched pixels to the proper size and by creating new pixels from a portion of the pixels immediately before and after the created pixel. The interpolator compensates for too many pixels per line by incorporating the values of the input pixels into the proper number of pixels by an interpolation technique.

U.S. Pat. No. 4,763,203 discloses a digital time base corrector, which is capable of correcting time base errors from video sources operating in trick mode. The corrector has a memory and a dropout detector. When a dropout is detected, the dropout portion of the video signal is replaced by previously stored values.

SUMMARY OF THE INVENTION

It is an object of the invention to propose an improved method for time base correction during generation of a digital video signal from an analog video signal, which allows to provide a standard signal.

According to the invention, this object is achieved by a method for time base correction during generation of a digital video signal from an analog video signal, including the steps of:
- receiving an analog video signal;
- generating a digital video signal from the analog video signal with a video decoder;
- storing at least a part of the digital video signal in a memory;
- detecting a portion of corrupt data having an abnormal field ordering in the digital video signal;
- either discarding the portion of corrupt data or replacing at least a part of the portion of corrupt data with previous data stored in the memory; and
- outputting the digital video signal.

Similarly, a device for time base correction during generation of a digital video signal from an analog video signal includes:
- an input for receiving an analog video signal;
- a video decoder for generating a digital video signal from the analog video signal;
- a memory for storing at least a part of the digital video signal;
- means for detecting a portion of corrupt data having an abnormal field ordering in the digital video signal;
- means for either discarding the portion of corrupt data or replacing at least a part of the portion of corrupt data with previous data stored in the memory; and
- an output for outputting the digital video signal.

Such a device for time base correction stabilizes the frame rate, e.g. at a constant 29.97 frames per second for NTSC and a constant 25 frames per second for PAL. The time base corrector favorably operates in the ITU656 digital video domain and corrects distorted digital video signals received from standard commercial-grade video decoder ICs by discarding bad fields, detecting and correcting unusual field-order sequences, detecting and correcting a variable frame frequency, and detecting and correcting errors in the video timing signals. Fields that are discarded are bad fields with uncompleted line samples, uncompleted lines and 2-bit VTRC (Video Timing Reference Codes) errors. 1-bit VTRC errors are corrected. The time base corrector advantageously has an ITU656 input interface for connecting a video decoder and an ITU656 output interface, which provides a perfect ITU656 data stream, for connecting an MPEG Encoder. All ancillary data in the ITU656 stream are passed through unchanged. In this way the MPEG Encoder chip receives a perfect ITU-R BT.656 4:2:2 data stream, which simplifies the internal processing of the MPEG Encoder. The invention solves the choke, pause and freeze problems caused by the uncompleted frame data and the reversed fields.

The ITU656 stream format as described in "Recommendation ITU-R BT.656-4: Interfaces for Digital Component Video Signals in 525-Line and 625-Line Television Systems Operating at the 4:2:2 Level of Recommendation ITU-R Bt.601 (Part A)" is shown in FIG. 1.

The time base corrector detects and corrects a plurality of signal distortions:

1. Bad fields: A video decoder may output bad fields when the video source is an untuned video channel. The untuned video channel may result in the video decoder providing fields with incomplete lines or an incomplete number of lines per field. Video fields with incomplete lines or an incomplete number of lines per field are classified as bad fields. In order to correct the occurrence of bad fields, the bad fields are either at least partly replaced with previous correct fields from a memory or discarded.

2. Abnormal field ordering: During editing of video sequences, field sequences may be reversed. A normal field ordering has Upper-Lower-Upper-Lower field ordering. An abnormal field ordering occurs, for example, when the current field is the same as the previous field, i.e. Upper-Lower-Lower-Upper-Lower or Upper-Upper-Lower-Upper-Lower. The abnormal field ordering is corrected by either discarding the current field or toggling its field type.

3. Detection of errors in the video timing reference codes (EAV, SAV): These errors can occur in the form of errors in the Vsync (V), Hsync (H), or Field (F) signals. A 1-bit error correction and a 2-bit error detection is achieved by using protection bits. The VTRC codes and the protection bits P1, P2, P3, P4 are indicated in Table 1.

TABLE 1

VTRC codes and protection bits

| Data bit number | First word (FF) | Second word (00) | Third word (00) | Fourth word (XY) |
|---|---|---|---|---|
| 9 (MSB) | 1 | 0 | 0 | 1 |
| 8 | 1 | 0 | 0 | F |
| 7 | 1 | 0 | 0 | V |
| 6 | 1 | 0 | 0 | H |
| 5 | 1 | 0 | 0 | P3 |
| 4 | 1 | 0 | 0 | P2 |
| 3 | 1 | 0 | 0 | P1 |
| 2 | 1 | 0 | 0 | P0 |
| 1 | 1 | 0 | 0 | 0 |
| (Note 2) | | | | |
| 0 | 1 | 0 | 0 | 0 |

NOTE 1
The values shown are those recommended for 10-bit interfaces.
NOTE 2
For compatibility with existing 8-bit interfaces, the values of bits D1 and D0 are not defined.
F = 0 during field 1, 1 during field 2
V = 1 during field blanking, 0 elsewhere
H = 0 in SAV, 1 in EAV
P0, P1, P2, P3: protection bits
MSB: most significant bit The state of the V and F bits is given in the following table of field interval definitions.

TABLE 2

Field interval definitions

| | | 625 | 525 |
|---|---|---|---|
| V-digital field blanking | | | |
| Field 1 | Start (V = 1) | Line 624 | Line 1 |
| | Finish (V = 0) | Line 23 | Line 20 |
| Field 2 | Start (V = 1) | Line 311 | Line 264 |
| | Finish (V = 0) | Line 336 | Line 283 |
| F-digital field identification | | | |
| Field 1 | F = 0 | Line 1 | Line 4 |
| Field 2 | F = 1 | Line 313 | Line 266 |

The protection bits are defined as follows.

TABLE 3

Definition of protection bits

| F | V | H | P3 | P2 | P1 | P0 |
|---|---|---|---|---|---|---|
| 0 | 0 | 0 | 0 | 0 | 0 | 0 |
| 0 | 0 | 1 | 1 | 1 | 0 | 1 |
| 0 | 1 | 0 | 1 | 0 | 1 | 1 |
| 0 | 1 | 1 | 0 | 1 | 1 | 0 |
| 1 | 0 | 0 | 0 | 1 | 1 | 1 |
| 1 | 0 | 1 | 1 | 0 | 1 | 0 |
| 1 | 1 | 0 | 1 | 1 | 0 | 0 |
| 1 | 1 | 1 | 0 | 0 | 0 | 1 |

By default, there is a 6-field or 3 frame delay caused by the time base corrector block processing. The field/frame delay favorably is a parameter programmable via an I2C bus. Likewise, a time base corrector block enable signal, which is an active high signal, shall be programmed via the I2C bus.

The ancillary data associated with each field does not require any processing. There is no re-insertion of ancillary data which is lost when bad fields are discarded. Of course, a different implementation with re-insertion of ancillary data is also possible.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
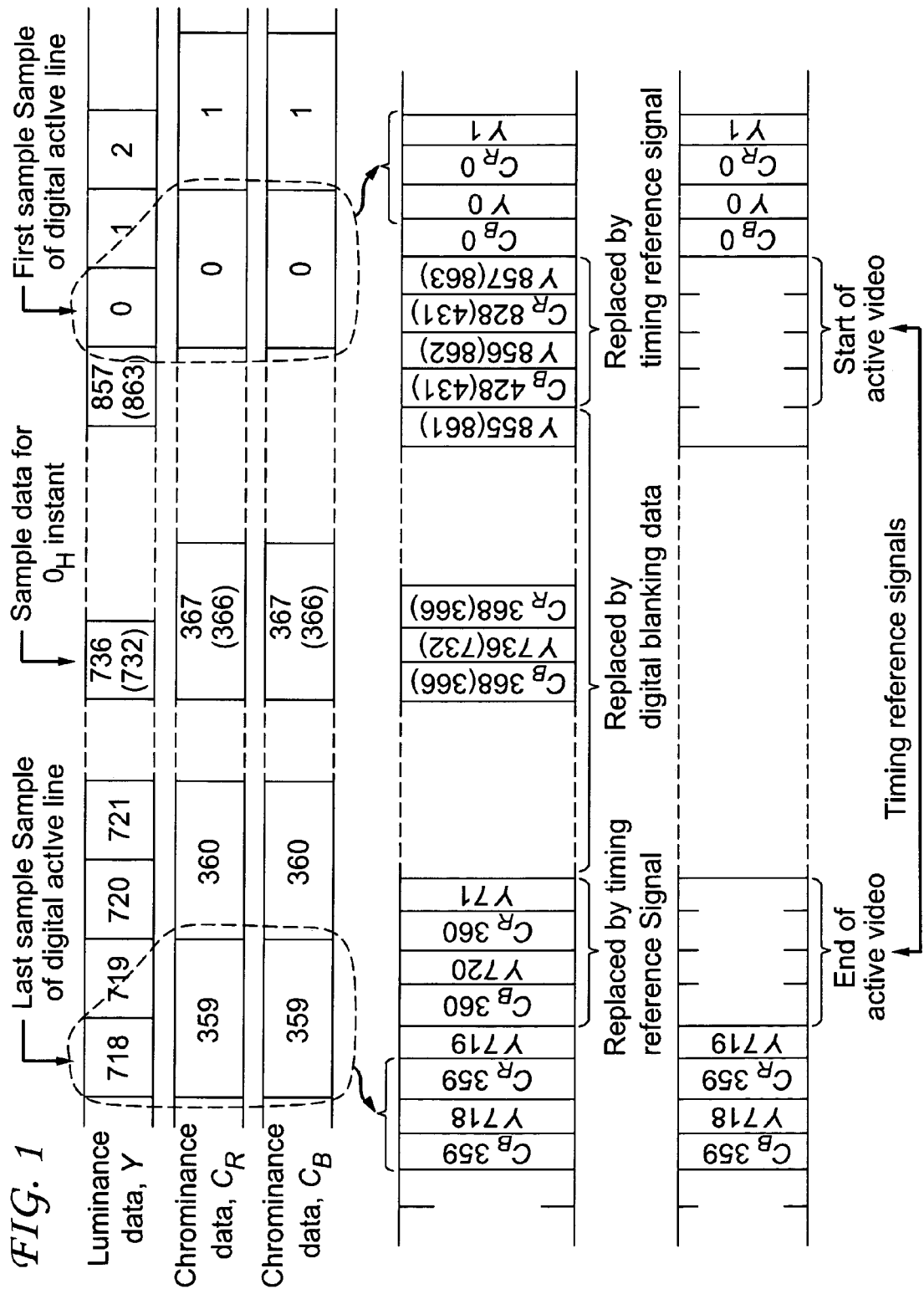
FIG. 1 shows the ITU656 stream format.
Figure 2:
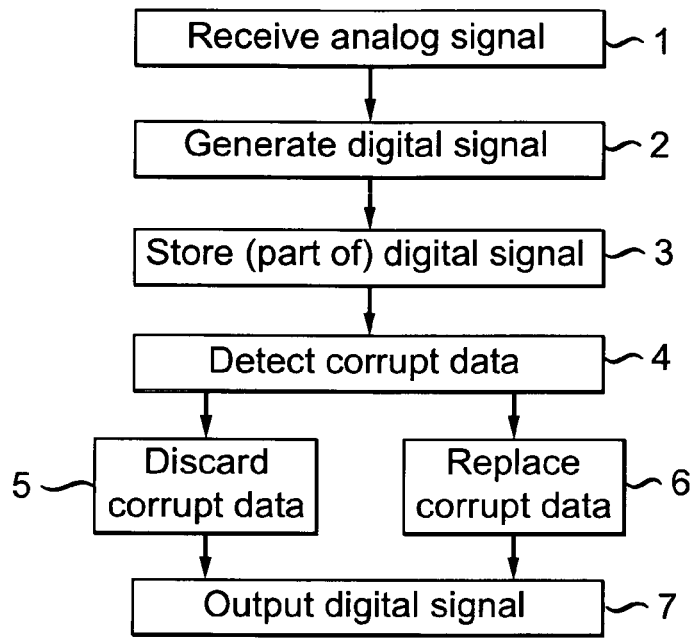
FIG. 2 depicts a method for time base correction according to the invention.

FIG. 2 depicts a method for time base correction according to the invention. After receiving 1 an analog video signal, a digital video signal is generated 2 from this analog video signal with a video decoder. At least a part of the digital video signal is then stored 3 in a memory. In the next step the digital video signal is checked 4 for portions of corrupt data. These portions of corrupt data are either discarded 5 or replaced 6 at least partly with previous data stored in the memory. The corrected digital video signal is finally output 7 for further processing.

Figure 3:
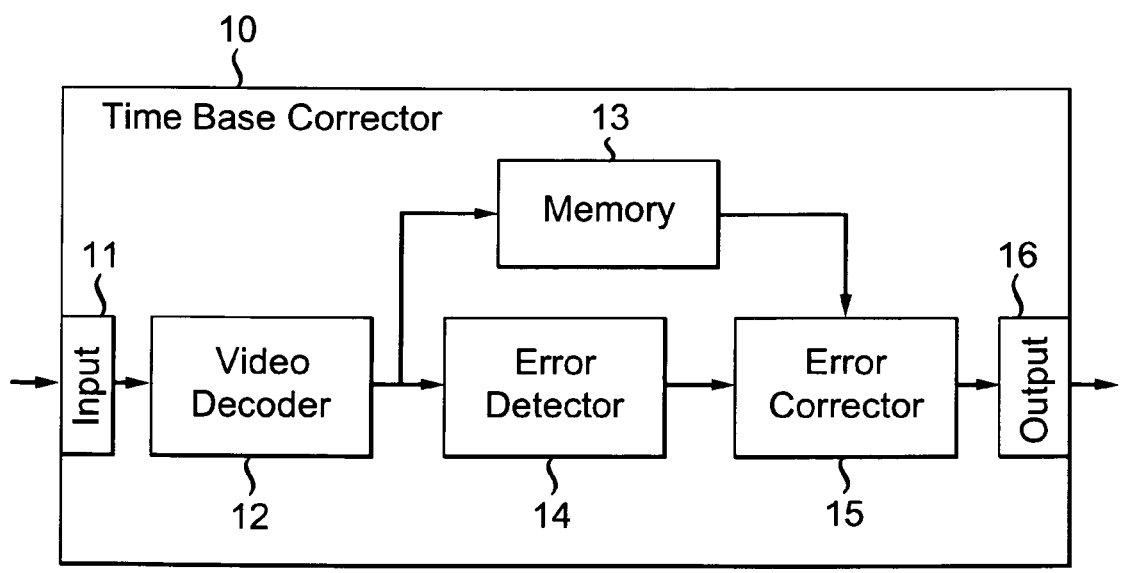
FIG. 3 schematically shows a device for time base correction according to the invention.

A corresponding device 10 for time base correction is shown schematically in FIG. 3. An analog video signal, which is received at an input 11, is passed to a video decoder 12 for generating a digital video signal. At least a part of the digital video signal is stored in a memory 13. The device 10 further includes means 14 for detecting a portion of corrupt data in the digital video signal and means 15 for either discarding the portion of corrupt data or replacing at least a part of the portion of corrupt data with previous data stored in the memory. The processed digital video signal is finally passed to an output 16 for further processing.

The different approaches to discarding or replacing portions of corrupt data in the digital video signal shall be explained in the following.

Figure 4:
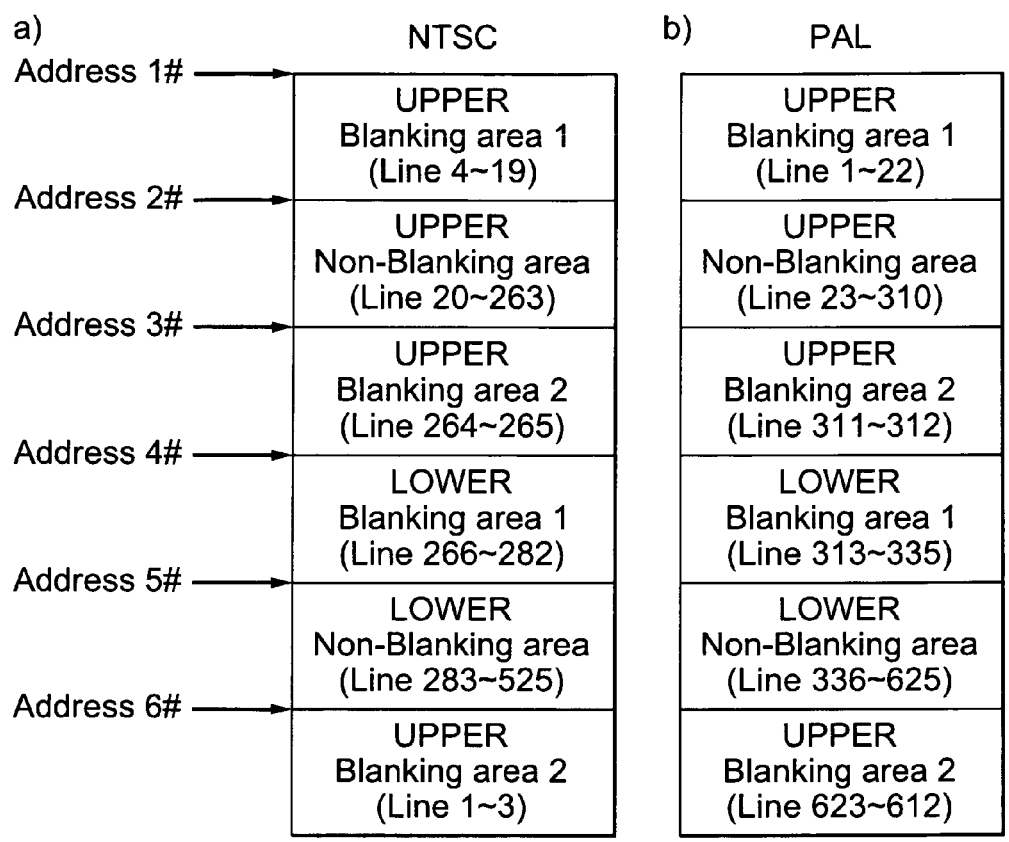
FIG. 4 depicts the NTSC and PAL frame memory mapping, FIG. 5 schematically depicts a method for rearranging frame data.

In FIG. 4 the memory mapping for NTSC (FIG. 4a)) and PAL (FIG. 4b)) is shown. The starting address of each area of the memories is fixed, such as Address 1#, Address 2# . . . .

Figure 5:
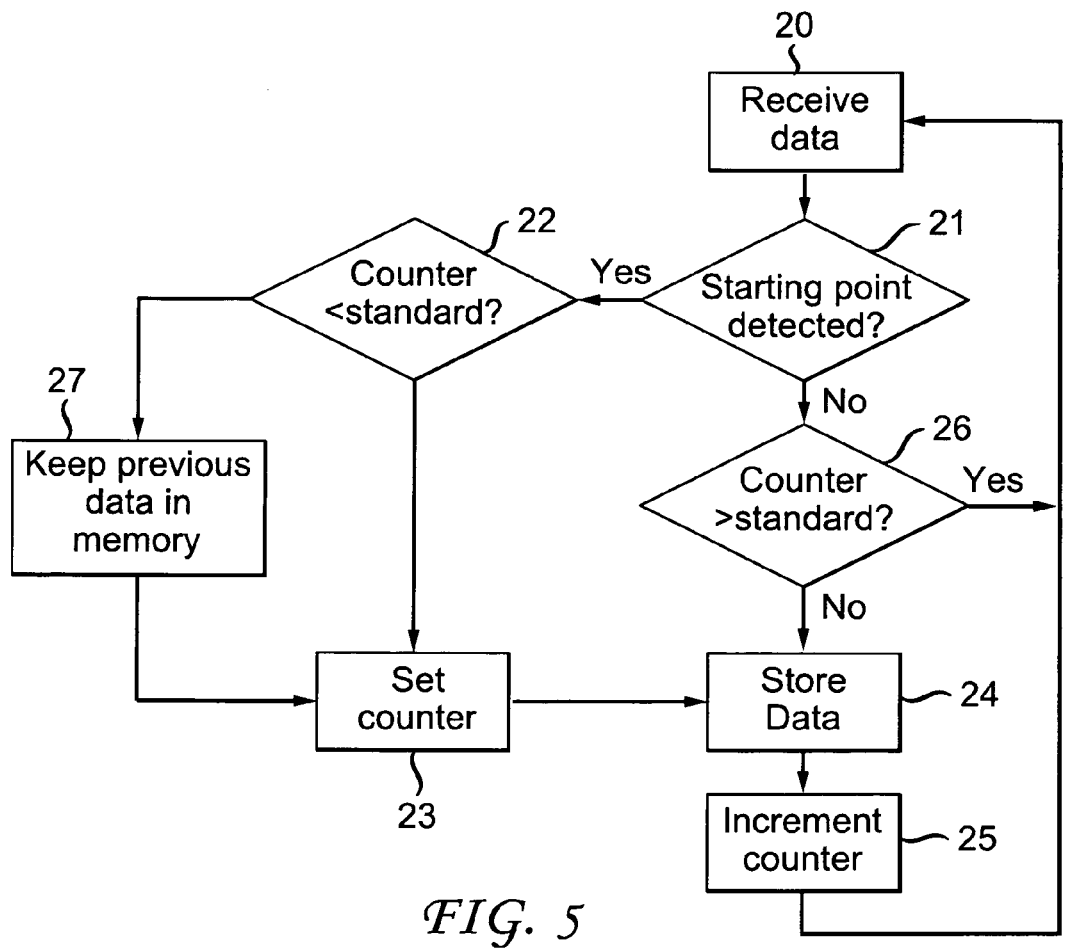
Figure 6:
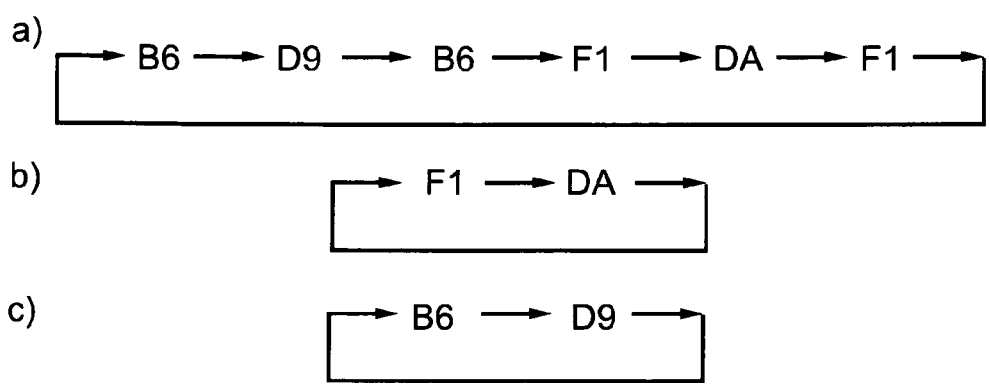
FIG. 6 shows the EAV sequence for normal field ordering, continuous upper fields and continuous lower fields.

A method for rearranging frame data is schematically depicted in FIG. 5. The frame data are rearranged for correcting the time base. Based on the SAV/EAV value the blanking and non-blanking lines are checked and the rearranged frame data are stored to the corresponding memory area. The current EAV data is saved in buf_0, the previous EAV data is saved in buf_1.

In the following, the method is explained with reference to the NTSC mode. For PAL mode only the line numbers need to be modified. After receiving 20 ITU656 stream data the EAV data is checked 21 for detecting a starting point. For example, when the value of buf_1 is "F1" and the value of buf_0 is "B6", the starting point of the Upper blanking video lines is detected. It is then determined 22 if a line counter is below a standard value. If this is not the case, the line counter is set 23 to "4" and the data is stored 24 into the memory at the starting Address 1#. The following Upper blanking video lines are also stored 24 into the Upper Blanking area 1 byte by byte and the line counter is increased 25 until the next starting point is detected 21.

Before storing the following blanking lines it is checked 26 if the number of the blanking lines exceeds the standard number of blanking lines, i.e. if the value of the line counter is already "20" but the value of buf_0 is still "F1".

In this case the data are no longer stored into the memory. Instead, further data are received 20 until the next EAV transition arrives.

If the number of the blanking lines is less than the standard number when the next starting point is detected 21, i.e. if the value of the line counter has not yet reached "20" but the EAV transition arrives, then the writing 24 to the current blanking area is stopped, the line counter is set 23 based on the buf_1 & buf_0 values and the following data are stored 24 to the corresponding memory area. For the missing lines the previous values in the Upper Blanking area 1 are kept 27.

In summary, when an EAV transition arrives, the line counter and the starting address of the memory are set to the corresponding value. When the number of lines is larger or smaller than the standard number of lines, the time base corrector either waits until the next EAV transition arrives or jumps to the new memory area based on the values of buf_1 & buf_0.

In NTSC mode, the end of the Upper field is detected when the value of the line counter signal is "266", the end of the Lower field is detected when the value of the line counter signal is "4".

Similarly, in PAL mode the end of the Upper field is detected when the value of the line counter signal is "313", the end of the Lower field is detected when the value of the line counter signal is "1".

The following tables summarize the memory mapping in the NTSC mode and PAL mode (Table 5) based of the values of buf_1 & buf_0.

TABLE 4

Memory mapping in NTSC mode

| Buf_1 | Buf_0 | Line counter | Starting address of memory |
|---|---|---|---|
| F1 | B6 | 4 | Address 1# |
| B6 | 9D | 20 | Address 2# |
| 9D | B6 | 264 | Address 3# |
| B6 | F1 | 266 | Address 4# |
| F1 | DA | 283 | Address 5# |
| DA | F1 | 1 | Address 6# |

TABLE 5

Memory mapping in PAL mode

| Buf_1 | Buf_0 | Line counter | Starting address of memory |
|---|---|---|---|
| F1 | B6 | 1 | Address 1# |
| B6 | 9D | 23 | Address 2# |
| 9D | B6 | 311 | Address 3# |
| B6 | F1 | 313 | Address 4# |
| F1 | DA | 336 | Address 5# |
| DA | F1 | 624 | Address 6# |

The standard frame structure in NTSC mode and PAL mode is shown in the following tables.

TABLE 6

Standard frame structure in NTSC mode

| Field | EAV | SAV | Line | Number of lines |
|---|---|---|---|---|
| Upper | B6 | AB | 4~49 | 16 |
|  | 9D | 80 | 20~263 | 244 |
|  | B6 | AB | 264~265 | 2 |
| Lower | F1 | EC | 266~282 | 17 |
|  | DA | C7 | 283~525 | 243 |
|  | E1 | EC | 1~3 | 3 |

TABLE 7

Standard frame structure in PAL mode

| Field | EAV | SAV | Line | Number of lines |
|---|---|---|---|---|
| Upper | B6 | AB | 1~22 | 22 |
|  | 9D | 80 | 23~310 | 288 |
|  | B6 | AB | 311~312 | 2 |

TABLE 7-continued

Standard frame structure in PAL mode

| Field | EAV | SAV | Line | Number of lines |
|---|---|---|---|---|
| Lower | F1 | EC | 313~335 | 23 |
|  | DA | C7 | 336~623 | 288 |
|  | F1 | EC | 624~625 | 2 |

The processing of the fields is based on the value of EAV. All abnormal cases that might be caused by a VCR are covered. The EAV values are related to the different lines of the video signal in the following way:

B6: Upper blanking line
9D: Upper non-blanking line
F1: Lower blanking line
DA: Lower non-blanking line Only three types of EAV sequences are valid. These are depicted in FIG. 5, where FIG. 5a) corresponds to the normal case, FIG. 5b) corresponds to the case of continuous Upper fields, and FIG. 5c) corresponds to the case of continuous Lower fields. All other sequences are considered invalid.

In order to correct the case of an sporadic reversed field as well as the case of a long sequence of continuous fields at the same time, the processing is to first force toggling of the reversed field and to return to the normal field order if the correct field ordering is detected. Considering, for example, the case "Upper1-Lower1-Lower2-Upper2-Lower3", in a first step Lower2 is toggled to Upper2#, i.e. the resulting sequence is "Upper1-Lower1-Upper2#-" Then Upper2 replaces Upper2#, which yields "Upper1-Lower1-Upper2-Lower3- . . . ". This is because it is considered that the occurrence of reversed fields has finished and the sequence has returned to normal order. In this case Lower2 is discarded. If there are, however, three continuous Lower fields, no field is discarded.

The field processing is summarized in the following table.

TABLE 8

Field processing

| Buf_1 | Buf_0 | Line counter PAL | Line counter NTSC | Detected previous field | Corrected previous field | Force toggle |
|---|---|---|---|---|---|---|
| B6 | 9D | 336 | 283 | Upper | Upper | Yes |
|  |  | 23 | 20 | Others |  | No |
| B6 | F1 | 313 | 266 | Upper | NA | No |
| 9D | B6 | 624 | 1 | Upper | Upper | Yes |
|  |  | 311 | 264 | Others |  | No |
| B6 | B6 | 1 | 4 | Upper | Lower | No |
|  |  | 313 | 266 | Upper | Upper | Yes |
| F1 | B6 | 1 | 4 | Lower | NA | No |
| F1 | DA | 336 | 283 | Others |  | No |
|  |  | 23 | 20 | Lower | Lower | Yes |
| DA | F1 | 624 | 1 | Others |  | No |
|  |  | 311 | 264 | Lower | Lower | Yes |
| F1 | F1 | 1 | 4 | Lower | Lower | Yes |

In the above table, Buf_0 is the buffer used for saving the current EAV data, while Buf_1 is the buffer used for saving the previous EAV data. The detected previous field indicates the status of the previous input field, while the corrected previous field indicates the corrected status of the previous field. In case a toggling was forced for the previous field, the value of the corrected previous field is different from the detected previous field. The line counter is generated based on Buf_1 and Buf_0. Its value is updated when the EAV arrives and reassigned when the EAV changes. The line counter is not always increased one by one. The value may jump based on the status of Buf_1 and Buf_0, which occurs when the incoming field lines are different from the standard ones. The range of the line counter is as follows.

TABLE 9

Range of the line counters

| Buf_0 | PAL | NTSC |
|---|---|---|
| B6 | 1~22, 311~335, 624~625 | 1~19, 264~282 |
| 9D | 23~310, 336~623 | 20~263, 283~525 |
| F1 | 1~22, 311~335, 624~625 | 1~19, 264~282 |
| DA | 23~310, 336~623 | 20~263, 283~525 |

The decision to force toggling is derived from Buf_1, Buf_0 and the value of the line counter, the detected previous field, and the corrected previous field. When the status of the decision to force toggling is "Yes", the "F" bit of SAV/EAV is inverted and the bits P0~P3 are updated. The detected previous field is derived from Buf_1, Buf_0 and the value of the line counter. The corrected previous field is derived from Buf_1, Buf_0 and the value of the line counter as well.

With regard to the detection of line samples, the standard number of horizontal lines is shown below in Table 10. All other cases are considered invalid.

TABLE 10

Standard number off horizontal lines

| Mode | EAV (FF, 00, 00, EAV) | Blanking data (80, 10, 80, 10 . . . ) | SAV (FF, 00, 00, SAV) | Active data (Cb, Y, Cr, Y) |
|---|---|---|---|---|
| PAL (bytes) | 4 | 280 | 4 | 1440 |
| NTSC (bytes) | 4 | 268 | 4 | 1440 |

A bad field is determined when any one of the following situations is encountered:
2-bit VTRC errors,
Line sample errors,
Invalid EAV sequence.

A field with 2-bit VTRC errors or incomplete lines, which has one or more abnormal samples in a line, is considered a bad field. Likewise, a field with an incomplete number of lines, which has an invalid EAV sequence, is also considered a bad field. In both cases the bad field is discarded. A field with an incomplete number of lines, however, which has a valid EAV sequence, is considered a good field that needs to be corrected, either by adding data lines from a previous field or by cutting excessive data lines.

What is claimed is:

1. Method for time base correction during generation of a digital video signal from an analog video signal, including the steps of:
   receiving an analog video signal;
   generating a digital video signal from the analog video signal with a video decoder;
   storing at least a part of the digital video signal in a memory;
   detecting a portion of the digital video signal having successive fields with a same parity;
   in case a portion of the digital video signal having the successive fields with the same parity is detected, either discarding the portion of the digital video signal having the successive fields with the same parity or replacing at least a part of the portion of the digital video signal having the successive fields with the same parity with previous data stored in the memory; and outputting the digital video signal.

2. Method according to claim 1, further-including the step of detecting at least one of a variable frame frequency, uncompleted lines, an incomplete number of lines, and 1-bit and 2-bit video timing reference code errors.

3. Method according to claim 1, further including the step of correcting 1-bit video timing reference code errors.

4. Method according to claim 1, wherein the step of discarding the portion of the digital video signal having the successive fields with the same rarity includes discarding one of the successive fields with the same parity.

5. Method according to claim 2, further including the step of discarding surplus data values of lines with too many data values.

6. Method according to claim 2, further including the step of replacing a missing line with data from a corresponding line stored in the memory.

7. Method according to claim 1, wherein the step of replacing at least a part of the digital video signal having the successive fields with the same parity with previous data stored in the memory includes replacing a field with a previous field stored in the memory.

8. Method according to claim 1, wherein the digital video signal is an ITU656 digital video signal.

9. Device for time base correction during generation of a digital video signal from an analog video signal, including:
   an input for receiving an analog video signal;
   a video decoder for generating a digital video signal from the analog video signal;
   a memory for storing at least a part of the digital video signal;
   means for detecting a portion of the digital video signal having successive fields with a same parity;
   means for either discarding the portion of the digital video signal having the successive fields with the same parity or replacing at least a part of the portion of the digital video signal having the successive fields with the same parity with previous data stored in the memory responsive to the detection of a portion of the digital video signal having the successive fields with the same parity; and
   an output for outputting the digital video signal.

10. Apparatus for receiving and/or recording a digital video signal, having an input for receiving an analog video signal and means for digitizing a received analog video signal, including means for performing a method according to claim 1 for time base correction during generation of the digital video signal from the received analog video signal.

* * * * *